United States Patent [19]

Murata et al.

[11] Patent Number: 5,120,202
[45] Date of Patent: Jun. 9, 1992

[54] SWITCHING DEVICE FOR RECIPROCATING PUMPS

[75] Inventors: Minoru Murata, Tokyo; Kazumasa Yamada, Urayasu, both of Japan

[73] Assignee: Yamada Yuki Seizo Co., Ltd., Tokyo, Japan

[21] Appl. No.: 547,913

[22] Filed: Jul. 3, 1990

Related U.S. Application Data

[62] Division of Ser. No. 306,454, Jan. 25, 1989.

[51] Int. Cl.[5] .................. F04B 17/00; F01L 21/04
[52] U.S. Cl. .................. 417/401; 91/224; 91/228; 91/229
[58] Field of Search .......... 417/399, 401; 91/224, 91/225, 228, 229

[56] References Cited

U.S. PATENT DOCUMENTS 3,094,938  6/1963  Blomeke et al. .............. 91/224
4,558,715  12/1985 Walton et al. ................ 417/399

FOREIGN PATENT DOCUMENTS 38723  3/1977  Japan.

Primary Examiner—Leonard E. Smith
Assistant Examiner—John A. Savio, III
Attorney, Agent, or Firm—Thomas R. Morrison

[57] ABSTRACT

The objective of the present invention is to provide a reciprocation switching device for a pump which will solve problems of conventional devices such as that, because coil springs are used for activating by their snap action valve operators or switching operators serving to control the pressure of pump working fluid in relation to reciprocating action of the pump, such devices require the numerous number of parts including spring fitting shafts, the structure to attach such fitting shafts, parts for spring holders, etc.; and that the assembling of those parts is troublesome. A device according to the present invention uses one or two wire springs made into a C-like shape as the springs for the aforementioned purpose and calls for fitting said springs directly between the spring fitting section(s) and the valve operator or the switching operator.

2 Claims, 10 Drawing Sheets

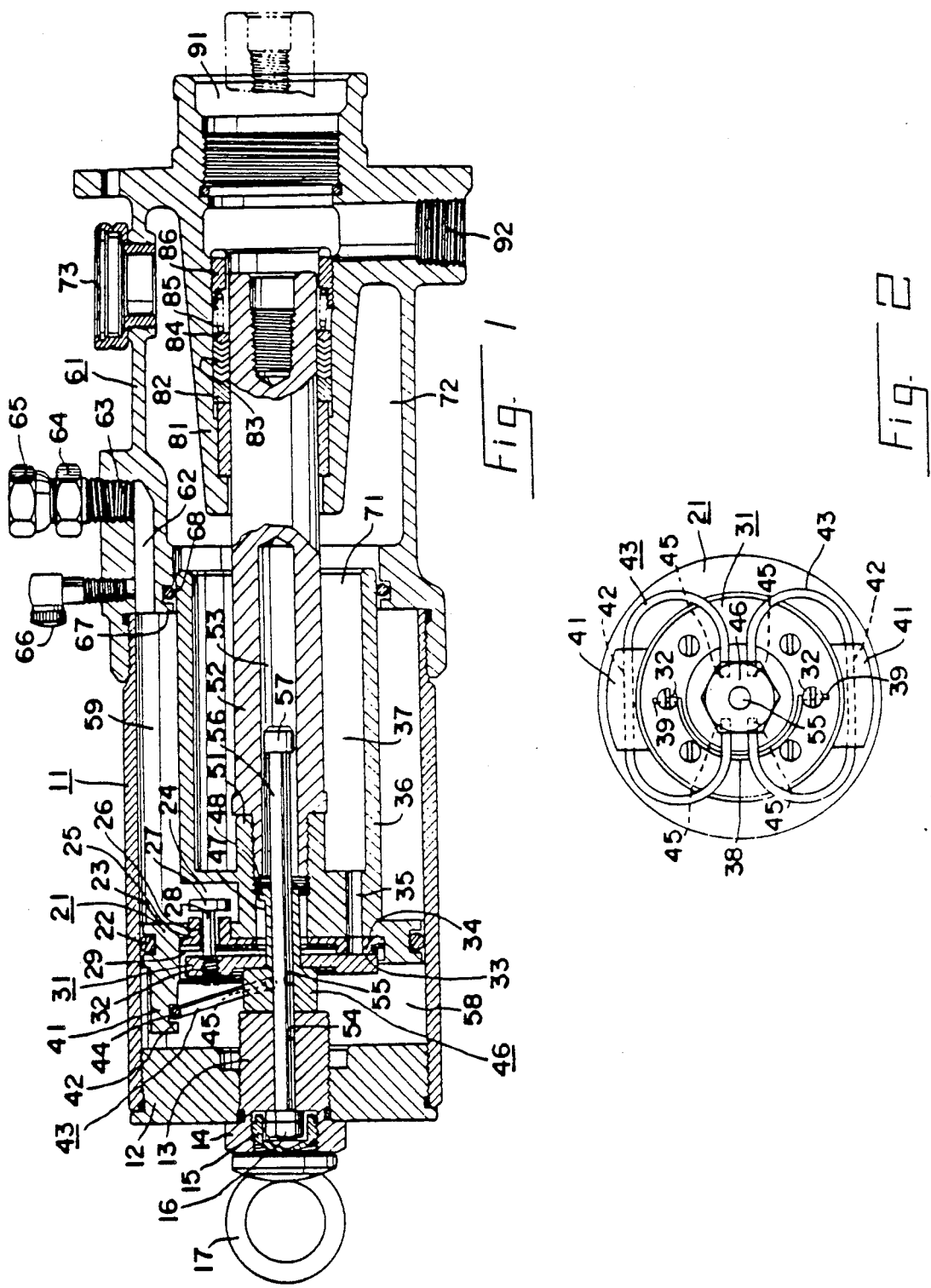

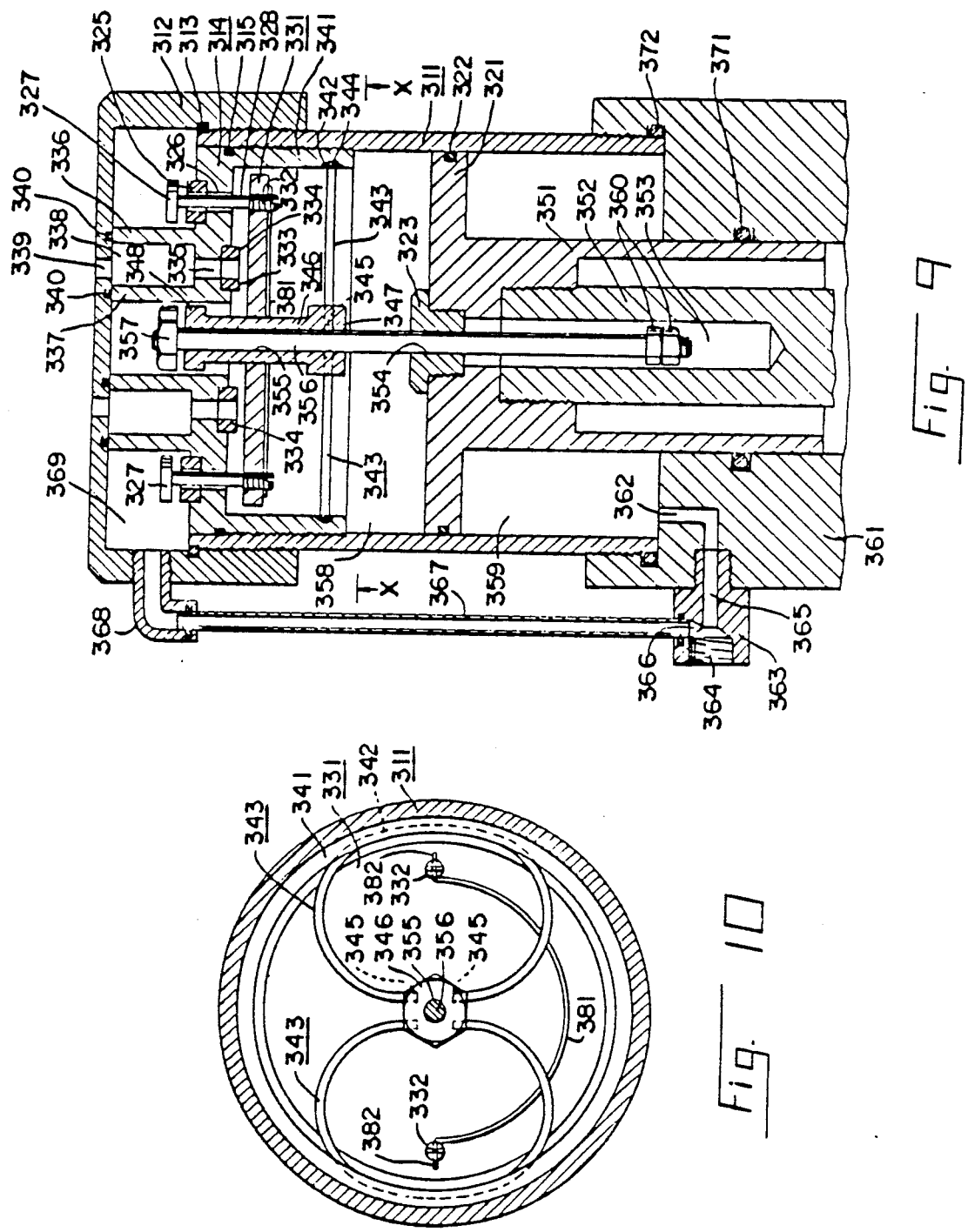

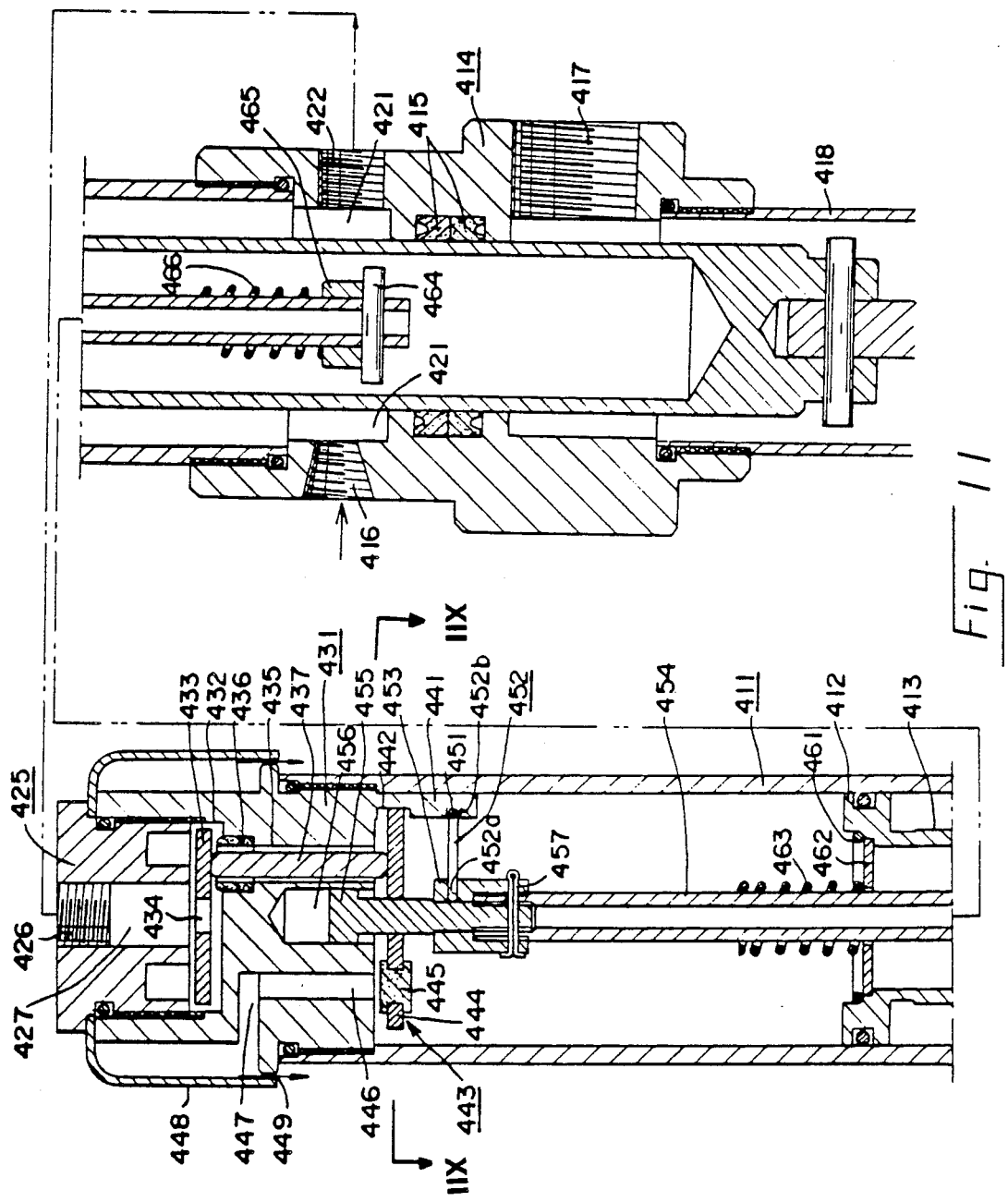

SWITCHING DEVICE FOR RECIPROCATING PUMPS

This is a divisional of co-pending application Ser. No. 07/306,454 filed on Jan. 25, 1989.

TECHNICAL FIELD

The present invention relates to a switching device for a pump which is reciprocated by automatically switching the application and removal of fluid pressure.

BACKGROUND ART

Conventional reciprocation switching devices for pumps typically call for, as described in Japanese Utility Model Publication No. 40805/1974 fitting a piston to the inside of the cylinder body so as to slide along the cylinder body; providing the said piston with two kinds of movable valves to control fluid pressure applied to one side of the piston and fluid pressure applied to the other side of the piston; and installing a valve operator at the center of the said piston to operate the two kinds of valves by snap-action by means of a spring working in relation to the reciprocating movement of the piston.

As a compressed coil spring is used for such a conventional device, it requires a spring fitting rod for attaching the spring; the structure that calls for so fitting this rod as to allow it to rotate around the valve operator installed at the center of the device; and a spring holder section so fitted to the said spring fitting rod as to slide against it and also to rotate around sections incorporated with the piston as one body. Therefore, such a conventional device presents a problem in that the assembling of those parts as described above is difficult and complicated and that the reduction of the cost is limited due to the numerous parts required.

Further, a known example of a conventional reciprocation switching device for a diaphragm pump is described in Japanese Patent Publication No. 23303/1967.

A device under the said patent consists of, as shown in FIG. 16, switching mechanism section 512 provided inside switching device body 511; working rod 515 inserted through said switching mechanism section 512 and reciprocated by working fluid supplied to and exhausted from two working fluid chamber 513 and 514 by turns; switching operator 519 so fitted between the larger diameter section 516 of said working rod 515 and sleeve 517 as to be able to move and be moved to a side or to the other side of switching valve chest 518; cavity-shaped switch 521 that is switched by said switching operator 519 and switches supply and exhaust to and from two working fluid chambers 513 and 514 of working fluid supplied to switching valve chest 518; and spring 522 to hold switching operator 519 at one side or the other side of switching valve chest 518 by applying spring pressure perpendicular at the neutral point to said switching operator 519.

Such conventional devices further call for moving switching operator 519 by means of reciprocating movements of working rod 515; sliding switch 521 by said switching operator 519; controlling supply and exhaust of working fluid (the air) from and to the two working fluid chambers (air chambers) 513 and 514; and continuously reciprocating working rod 515.

Diaphragms 523 and 524 are a part of both ends of said working rod 515. These diaphragms 523 and 524 partition the chambers to form said working fluid chambers 513 and 514 and pump chambers 525 and 526. As said working rod 515 moves, volumes of said pump chambers 525 and 526 change, thus creating pumping strokes. For example, in case working rod 515 moves towards the right, the liquid contained in chamber 525 at one side of the device is pushed, by volume contraction of said pump chamber 525, out of discharge port 528 through check valve 527 at the discharging side. Meanwhile, the liquid is sucked, by volume augmentation of pump chamber 526 at the other side, out of suction port 529 into said pump chamber 526 through check valve 530 provided at the suction side. Such right and left pumping action is repeated by turns by the automatic switching of working fluid at said switching mechanism section 512.

In such conventional reciprocation switching devices, the configuration for the spring to apply pushing pressure to switching operator 519 calls for attaching cylindrical slider 531 to one end of compressed coil spring 522; insetting one ball-shaped end 534 of activator 533 in cavity 532 at the end of said slider 531, so as to allow ball-shaped end 534 to rotate; and insetting the other ball-shaped end 535 of activator 533 in cavity 536 of said switching operator 519 so as to allow it to rotate.

Thus, compressed coil spring 522 is used in a conventional structure, and therefore it is necessary to install said cylindrical slider 531 and activator 533 between said spring 522 and switching operator 519, a configuration which presents a problem in that the assembling of such parts is not an easy task.

Such a conventional configuration further presents a problem in that, as cavity-shaped switch 521 slides along the working rod, abrasion tends to occur between said switch 521 and the opposing metal and that it thus becomes necessary to use special wear-resistant metal at such sliding section.

The objective of the present invention is, by using a spring of a special shape for the snap action of the reciprocation switching device for a pump, to make it possible to install such spring of a special shape directly in the valve operator or the switching operator so that number of parts can be reduced; configuration becomes easier; and the cost of the device can be largely reduced compared with conventional devices.

Another objective of the present invention is to improve durability of the valve configuration without using special metals.

A further objective of the present invention is to make it considerably easier to attach the spring used for the snap action of a reciprocation switching device for a pump.

A further objective of the present invention is to make the diameter of such reciprocation switch device smaller.

The present invention relates to a reciprocation switching device for a pump in which piston 21 is so fitted into cylinder body 11 as to be able to slide therein; two kinds of valves 27 and 31 that control pressure of working fluid applied to one side and to the other side of piston 21 are attached to said piston 21 so as to be allowed to move freely; and valve operator 46 that operates said two kinds of valves 27 and 31 by the snap action of spring related to reciprocating movement of the piston is provided at the center of said piston 21, and the present invention calls for symmetrically providing each of C-shaped wire springs 43, which serve as the aforementioned spring, between spring fitting section 41, which forms a part of piston 21, and said valve operator 46 at the center of the piston.

Further, according to the present invention, when valve operator 46 is moved in relation to movement of piston 21, from the starting of movement of valve operator 46 to the neutral point, where wire springs 43 become perpendicular to the direction of piston rod, compressive force is applied to C-shaped wire springs 43 in a direction so as to push the edge of the spring towards the other side so that the wire spring is flexed; and after the said neutral point, valve operator 46 is immediately switched to the reversed stable position by restoring force of same wire springs 43 and held at such stable position.

According to the present invention, it is possible to considerably reduce the number of parts compared with conventional device using pressure coil springs and also to make installation of such wire spring much easier, and thus product cost can be lowered on a large scale.

The present invention further calls for a reciprocation switching device including switching valve chest 122 provided in the body of switching device 111; working rod 113 inserted through said switching valve chest 122 and reciprocated by working fluid supplied and exhausted by turns into and from two working fluid chambers 118 and 119; switching operator 123 movable and fitted around said working rod 113 in the direction of the rod and to be moved from one side or to the other side of switching valve chest 122; cavity-shaped switch 127 activated by said switching operator 123 to switch supply and discharge of working fluid supplied to switching valve chest 122 into and from two working fluid chambers 118 and 119; and a spring to hold switching operator 123 at one side or the other side of switching valve chest 123 by applying spring pressure to said switching operator 123, the direction of pressure at the neutral point being perpendicular to the switching operator, wherein C-shaped wire spring 164 which is formed by bending wire material with circular cross section so that the both ends face each other is used for the aforementioned spring; both ends 172 of said wire spring 164 are inserted into holes 174 horizontally bored in said switching operator 123 and movable therein; and straight portion 171 of said wire spring 164 is so fitted in spring holder 163, which is installed to face said switching valve chest 122, as to be allowed to rotate freely.

According to the present invention, as working rod 113 moves, switching operator 123 is also moved; as said switching operator 123 approaches the neutral point, wire spring 164 between switching operator 123 and spring holder 163 rotates with its straight portion 171 as the fulcrum and is simultaneously compressed; the switching operator having passed the neutral point, restoring force conserved in wire spring 164 is immediately released in the direction where the working rod is moving to; and switching operator 123 fitted around working rod 113 so as to be movable along the working rod is instantly moved, as far as its fitting allows, to its terminal point in the moving direction of the rod. At this moment, switching operator 123 is caught by switch 127, which is also moved immediately; and supply and discharge of working fluid from and into working fluid chambers 118 and 119 is switched instantly.

Assembling of the parts calls for inserting both ends of wire spring 164 into switching operator 123 and fitting spring holder 163 to the straight portion 171 of said wire spring 164. Pressurization is applied from said spring holder 163 to wire spring 164.

According to the present invention, installation of the spring in the switching valve chest is quite easy, requiring only fitting the wire spring to the switching operator and setting the spring holder, and the number of necessary parts is relatively few. Therefore, product cost can be considerably less than that of conventional device.

The present invention further relates to a reciprocation switching device for a pump including switching mechanism section 244 provided inside switching device body 241 in order to control the switching of supply and discharge of working fluid into and from the two working fluid chambers 242 and 243 alternately; working rod 245 inserted through said switching mechanism section 244 and reciprocated by working fluid alternately supplied and discharged into and from the two fluid chambers 242 and 243; switching operator 261 fitted around said working rod 245 so as to be movable along the working rod and moved to the switching positions at one side and the other side in relation to reciprocating movement of working rod 245; and wire springs 271 to push said switching operator 261 to the switching position at one side or the other side by applying spring pressure perpendicular to said switching operator 261 at the neutral point, wherein said wire springs 271 are formed into C-shape by bending both ends of wire material so that the both ends face with each other; both ends 272 of each of said wire springs 271 are so inserted into holes 273, which are horizontally bored in said switching operator 261 or material 266 that forms a part of the switching operator 261, as to be allowed to rotate therein; and straight portion 274 of each of said wire springs 271 is so fitted in spring holder 275 provided in said switching device body 241 as to be allowed to rotate. The device further includes valves 291, 292 and 294, which are provided in said switching operator 261 and switched by said switching operator 261 to switch supply and discharge of working fluid supplied into switching mechanism section 244 into and from the two working fluid chambers 242 and 243 by contact with said separated from valve seats 285, 286, 288 and 289.

According to the present invention, as working rod 245 moves, switching operator 261 is also moved; as said switching operator 261 approaches the neutral point, wire springs 271 between switching operator 261 and spring holders 275 rotate with their respective straight portion 274 as the fulcrum and are simultaneously compressed; switching operator 261 having passed the neutral point, restoring force conserved in wire springs 271 is immediately released in the direction where the working rod is moving to; and switching operator 261, which is so fitted around working rod 245 as to be movable in its axial direction, is in an instant move, as far as the fitting allows, to the terminal point in the direction of the working rod's movement. With this movement of switching operator 261, valves 291, 292 and 294 are instantly moved; and supply and discharge of working fluid into and from working fluid chambers 242 and 243 is also switched immediately.

Assembling of the parts calls for fitting straight portions 274.

of wire springs 271 to spring holders 275 and inserting both ends 272 of each wire spring 271 into switching operator 261.

The present invention has a benefit in that the number of parts required can be reduced and that installation of the spring is much easier, so that a large scale reduction in cost is possibe. Furthermore, because supply and discharge of working fluid is switched by means of contact with and separation of valves from valve seats, no part of the valve structure is exposed to abrasion, so that deterioration of durability due to abrasion can be prevented.

The present invention further relates to a reciprocation switching device for a pump wherein piston 321 is fitted into cylinder body 311 so as to be allowed to slide freely; cylinder body 311 incorporates at its upper part as one body valve seat attaching section 314; two kinds of valves 327 and 331 are so attached to be allowed to move and oppose two kinds of valve seats attached to said valve seat attaching section 314, said valves to serve to control, in relation to pressure of working fluid applied to the lower side of piston 321, pressure of working fluid applied to the upper side; valve operator 346 to operate two kinds of valves 327 and 331 by means of snapping action of springs in relation to reciprocating movement of piston 321 is attached to the center of said valve seat attaching section 314; and C-shaped wire springs 343 are attached, serving as the aforementioned spring, between spring attaching section 341, which forms a part of said valve seat attaching section 314, and said valve operator 346 at the center.

According to the present invention, valve operator 346 is moved in relation to the movement of piston 321, wherein, from the starting of valve operator 346's 's movement to the neutral point where wire springs 343 become perpendicular to the direction of the piston, compressive force is applied to C-shaped wire springs 343 in the direction of pushing the edges of the springs, which have a gap in between them, so that the springs yield, and the springs having passed neutral point, valve operator 346 is instantly switched to the stable conditions at the opposite side by restoring force of said wire springs 343 and held in such condition.

The present invention has the benefit in that the number of parts required can be considerably reduced from that required for a conventional device using a compressed coil spring and that installation of the spring is quite easy, so that a large scale reduction of product cost is possible. Furthermore, because valve seats and valves are installed by means of the valve seat attaching section at the upper part of the cylinder body, it is possible to make the diameter of the piston and the cylinder smaller.

The present invention further relates to a reciprocation switching device for a pump wherein piston 412 incorporated with pump operation rod 413 at its lower part as one body is so fitted inside cylinder body 411 to be allowed to slide; valve body 431 at the upper part of cylinder body 411 forms a part of the cylinder body; working fluid intake vents 435 to supply working fluid, which has been conveyed into the lower part of piston 412, also to the upper side of piston 412 and working fluid exhaust vents 446 to discharge working fluid at the upper part of piston 412 are provided on said valve body 431; intake valve 433 is so provided at the upper end of working fluid intake vents 435 as to open and close freely; valve operators 453 and 455 to open or close intake valve 433 and exhaust valve 443 respectively in relation to reciprocating movement of piston 412 are so provided at the center of said valve body 431 as to be able to move up and down; C-shaped wire springs 452 in order to operate, by means of snapping action, said valve operators are provided between spring attaching sections 441, which project downward from said valve body 431, and valve operator 453; and wherein working fluid supplier 425, into which working fluid to be supplied to the lower part of piston 412 is constantly conveyed, is provided on the upper side of said valve body 431 concentric to each other; said intake valve 433 is provided between said working fluid supplier 425 and working fluid intake vents 435 of valve body 431; and working fluid exhaust ducts 447 and 449, including said working fluid exhaust vents 446, on the outer side of valve body 431.

According to the present invention, while valve operators 453 and 455 are held up by wire springs 452, working fluid exhaust vents 446 are kept closed by exhaust valve 443 and intake valve 433 is kept open by working fluid intake vent 435. Therefore, working fluid, which is constantly supplied to working fluid supplier 425, is applied with pressure through working fluid intake vents 435 into the space above piston 412, thus pushing down piston 412. When said piston 412 reaches the point immediately before the lowest limit, valve operators 453 and 455 are moved downward, so that exhaust valve 443 is opened together with closure of intake valve 433; and piston 412 is moved upward by air supplied to its lower area.

The present invention has the benefit in that passage for supply of working fluid can be compactly provided in the center of the valve body and that it becomes possible to make the diameter of reciprocation switching device of this kind smaller.

BRIEF DESCRIPTION OF THE DRAWINGS

FIG. 1 is a schematic section view with cutting angle of 90° according to the first embodiment of the present invention;

FIG. 2 is a schematic plan of a piston of same;

FIG. 9 is a schematic section view of a reciprocation switching device according to the fourth embodiment of the present invention;

FIG. 10 is a schematic section view, cut at X—X line, of FIG. 9;

FIG. 11 is a schematic section view with cutting angle of 90° of a reciprocation switching device according to the fifth embodiment of the present invention;

DESCRIPTION OF THE PREFERRED EMBODIMENT

Figure 3:
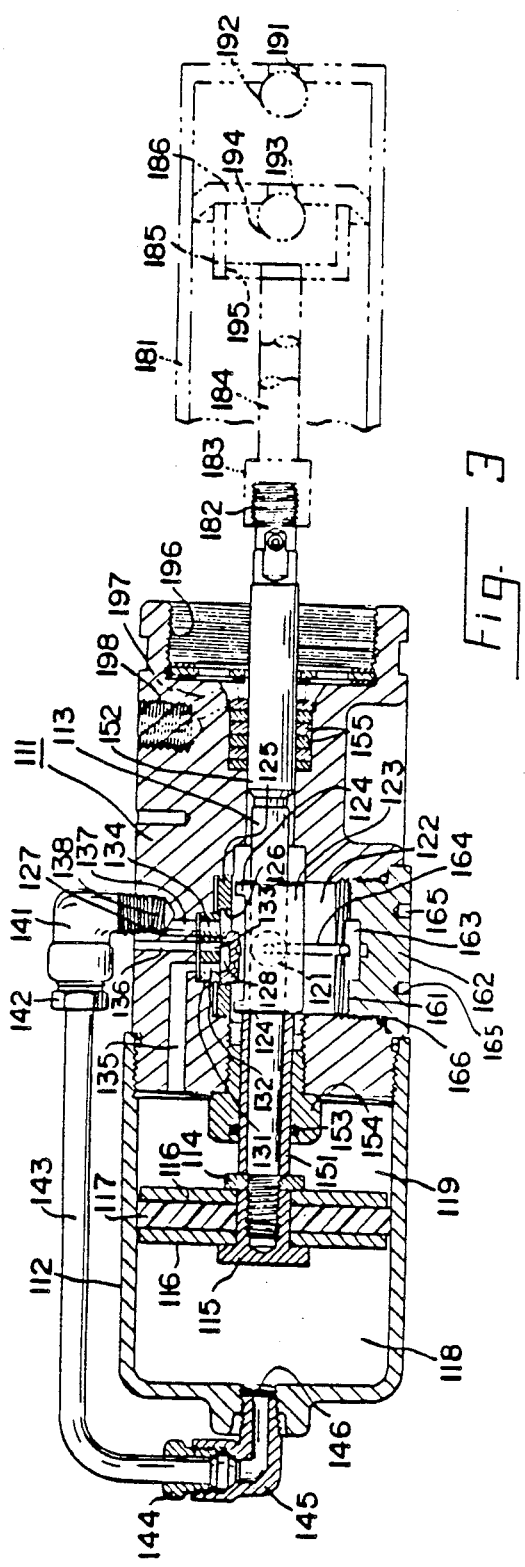
FIG. 3 is a schematic section view of a reciprocation switching device according to the second embodiment of the present invention.

The illustrated first preferred embodiment of the present invention will be described hereunder referring to the attached drawing of FIG. 1;

First Embodiment

FIG. 1 is a schematic section view with cutting angle of 90° showing a reciprocation switching device, wherein cylinder head 12 is screwed into the left end of cylinder body 11; head bolt 13 is screwed into the center of said cylinder head 12; and the inner end of said bolt 13 protrudes into cylinder body 11. Further, handle bolt 15 is screwed into head 14 of said head bolt 13; and a lock nut is attached inside this bolt 15. Handle 17 forms a part of said handle bolt 15.

Piston 21 is so inserted into said cylinder body 11 with O ring 22 in between as to be able to slide. Cavities 24 are formed at the right side 23 of said piston 21; valve seats 25 made of rubber, etc. are attached to piston 21 so as to face said cavities 24; and shaft 28 of each valve 27 is movably inserted into air intake vent 26 of each of said valve seat 25. The rubber material which forms said valve seats is fixed to the surface of the piston by supporting plate 29. Although only one set of said cavities 24, valve seats 25 and valves 27, etc. is shown in FIG. 1, which is a 90° section view, two sets of these are symmetrically provided in an actual device.

Valve 31 made in the shape of a disk is provided in the cavity at the left side of said piston 21; and threaded portion 32 of shaft 28 of each said valve 27 is screwed into said valve 31. Valve seats 34 attached to said piston 21 face surface 33 of said disk-shaped valve 31, the surface being 90° off the fitting position of said valve 27. Said valve seats 34 are made of the same rubber material as that of said valve seats 25 so that the two sets of valve seats are incorporated into one body; and the vent holes of these valve seats 34 are connected to exhaust duct 37 in piston skirt 36 through exhaust vents 35 bored in piston 21. Although only one set of said valve seats 34 and exhaust vents 35 is shown in FIG. 1, which is 90° section view, two sets of these are provided symmetrically in an actual device.

As shown in FIG. 2, straight portions 39 at the both ends of semicircular toggle 38 are inserted from the inside to threaded portions 32 of said valves 27 to prevent them from rotating. In case this toggle 38 should be removed for disassembly, inserted parts 39 at the both end must be moved to the center, against the toggle's elasticity, and thus be removed from said threaded portions 32.

As shown in FIGS. 1 and 2, spring fitting sections 41 are formed at the both sides of piston 21; and groove 42 is provided on the inner surface of each of said spring fitting section 41. Straight portion 44 at the center of each C-shaped wire spring 43 is fitted in each of said groove 42. Both ends 45 of each wire spring 43, facing each other with the gap in between, are fitted to horizontal grooves bored at the side of valve operator 46. Valve operator 46 has cylindrical section 47, which is so inserted through the center of said disk-shaped valve 31 as to be able to slide. Catching ridge 48 is provided at the end of said cylindrical section 47.

Plunger 52 is screwed into rod section 51 of piston 21 as one body; and switching rod 56, which is so fitted into center hole 54 of said head bolt 13 and center hole 55 of valve operator 46 as to be able to slide, is inserted to the hollow inside 53 of said plunger. Stopper 57 to catch said catching ridge 48 is incorporated at one end of said switching rod 56; said lock nut 16 is screwed over the other end of switching rod 56; and switching rod 56 is attached with cylinder body 11 as one body by fastening said lock nut 16 with said bolts 13 and 15.

Inside of said cylinder body 11 is divided into two sections by piston 21: working air chamber 58 located at one side of piston 21 and working air chamber 59 located at the other side of piston 21, around the piston skirt.

Pump body 61 is screwed over said cylinder body 11; air intake duct 62 connected to said working air chamber 59 is incorporated in said pump body 61; and said air intake duct leads to an air intake hose, etc. (not shown), through air intake port 63 and connecting pieces 64 and 65, and is provided with oil cup 66. Around the inner surface at the left side 67 of said pump body 61, O ring 68 is fitted, and with this O ring 68, the air pressure of working air chamber 59 is maintained.

Exhaust duct 37 formed inside said piston skirt 36 is open at one end; said end 71 is open to exhaust chamber 72 inside pump body 61; and said exhaust chamber 72 leads to the outside air through exhaust port 73.

Packing receiver 82, V packing 83, packing gland 84, spring 85 and retainer 86 are attached to the inside of cylindrical section 81 formed at the center of pump body 61 as one body so that the fluid density around plunger 52 be maintained by said packing 83.

Support port 91 to introduce material to be pumped and pumped material discharge port 92 are provided at the end and side of pump body 61 respectively. Said suction port 91 leads to a container of pumping material through a check valve for suction (not shown); and said discharge port 92 leads to, through a check valve for discharge (not shown), a container where pumped material can be conveyed to by pressure.

The pump is used at standing position, vertical with said suction port 91 at the bottom.

Action of a device according to the present embodiment will be described hereunder referring to the attached drawing of FIG. 1, commencing from the condition of the device as illustrated in FIG, 1;

The air, which is to serve as working fluid, supplied with pressure from air intake port 63 through air intake duct 62 into air chamber 59 enters into air chamber 58 at the left side through air intake vents 26 at valve seats 25, which are then open. At this moment, valve seats 34 at the exhaust side are kept closed with disk-shaped valve 31. Air pressure upon the left and right sides of piston 21 is identical in this case, but the sizes of left and right areas under pressure are different, depending on the presence of piston skirt 36; as the area under pressure and facing air chamber 58 of the piston is larger than that facing air chamber 59 by the portion of sectional area of piston skirt 36 based on the outside diameter, the force applied by air pressure of air chamber 58 upon piston 21 is larger, and therefore piston 21 moves towards right in FIG. 1. Plunger 52 does discharge action in this stroke.

Near the end of said discharge stroke, catching ridge 48 of valve operator 46 contacts stopper 57 of switching rod 56, thus terminating the movement of valve operator 46; but piston 21 still continues to move to the right and so straight portions 44 at the center of wire springs 43. At this stage, when compressive force works between straight portion 44 and end parts 45 of each wire spring 43 so that straight portion 44 comes further right than exactly above both end parts 45, valve operator 46 is switched immediately to the left of piston 21 by restoring force of wire springs 43. With this switching, catching ridge 48 hits disk-shaped valve 31, which opens valve seats 34 for exhaust and at the same time valves 27 close valve seats 25 for air intake.

Thus air supply to the left air chamber 58 is terminated, and piston 21, exposed to air pressure only from the right air chamber 59, moves to the left. At this amount, the air contained in the left air chamber 58 is exhausted to the outside of the system through opened valve seats 34, exhaust vents 35, exhaust duct 37, exhaust chamber 72 and exhaust port 73 in this order. In this moving process to the left, plunger 52 does suction stroke.

Near the end of this moving process of piston 21 to the left, valve operator 46 is caught by head bolt 13, thus the movement of valve operator 46 is terminated; but piston 21 still continues to move to the left and so straight portions 44 at the center wire springs 43. At this stage, when compressive force works between straight portions 44 and each end 45 of wire springs 43 so that straight portions 44 come further left than exactly above both end parts 45, valve operator 46 is switched immediately to the right of piston 21 by restoring force of wire springs 43. With this switching, valve operator 46 hits disk-shaped valve 31, which closes valve seats 34 for exhaust, and at the same time valve seats 25 for air intake are opened, the condition of the device returning to that shown in the drawing.

Second Embodiment

As shown in FIG. 3, cylinder 112 is screwed air-tight over the left end of switching device body 111; working rod 113 is so inserted into the center of switching device body 111 so as to be able to move; washer 114 and cap nut 115 are screwed over the left end of said working rod 113; piston 117 comprising a pair of disks 116 and packing is sandwiched and thus supported by said washer and nut; and left working fluid chamber 118 and right working fluid chamber 119 are provided inside cylinder 112 with said piston 117 in between.

Intake port 121 to which the compressed air is to be supplied is provided on the side of switching device body 111 and leads to switching valve chest 122 formed at the center of switching device body 111. Inside this switching valve chest 122, switching operator 123 is so fitted around said working rod 113 as to be able to slide along it within the specified scope. A cavity is formed at the top of switching operator 123; and at both ends of said cavity, catching ridges 124 are formed so as to be perpendicular to the moving direction of the operator. Guide plate 125 is so attached to the device body 111 as to face the upper surface of said switching operator 123, and to said guide plate 125, switch 127 is so fitted as to be able to move in the direction of the rod. Said switch 127 has cavity 128 at its top end.

Metal plate 131 with high abrasion resistance is fitted to the surfaces which slide against said switch 127, switch 127 having the same high abrasion resistancy, and air supply vent 132, exhaust vent 133 and air supply vent 134 are bored in said metal plate 131. Each of these vents 132, 133 and 134 are respectively connected to air supply vent 135, exhaust vent 136 and air supply vent 137 bored in switching device body 111; and air supply vent 137 further leads to connecting port 138 bored in body 111. Pipe 143 is connected, through elbow 141 and pipe joint 142, to said connecting port 138, which is further connected to connecting port 146 of cylinder 112 through pipe joint 144 and elbow 145.

Said working rod 113 is provided with bush 151 fitted to the left side of switching operator 123 as well as large diameter section 152 at the right. Grand housing 154 is fitted to bush 151 through O ring 153, and packing 155 is fitted to large diameter section 152.

At the bottom of said switching valve chest 122, tapped hole 161 with a large diameter is provided, together with plug 162 screwed into it. Disk-shaped spring holder 163 is so fitted to the top of plug 162 as to rotate freely; and wire spring 164 formed with wire material with round section (piano wire) is provided between said spring holder 163 and switching operator 123. Tool catching holes 165 are bored in the outer surface of plug 162 to rotate this plug 162, to the outer surface of which O ring 166 is fitted to maintain airtightness of switching valve chest 122.

Figure 4:
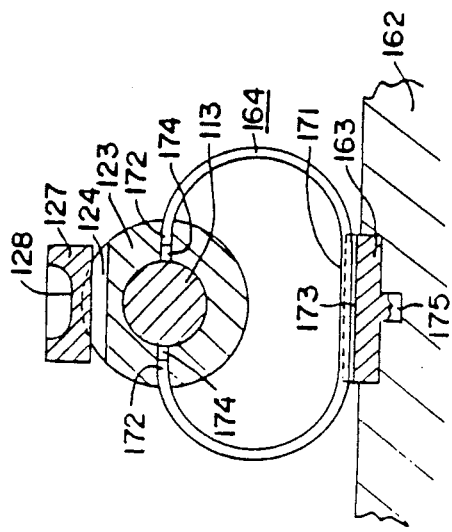
FIG. 4 is a schematic horizontal section view of principal part of same.

As shown in FIG. 4, wire spring 164 is formed into a O-like shape with straight portion 171 at its center and both ends 172 bent to face each other. Straight portion 171 of said wire spring is inset in groove 173 of spring holder 163 so that, due to circular cross section of the spring, the spring is able to rotate. Further, both ends 172 of wire spring 164 are so fitted into holes 174 horizontally bored in the center of said switching operator 123 as to be able to rotate. Ridge 175 to set its position in relation to plug 162 is formed at the bottom of spring holder 163.

Procedures of fitting said wire spring 164 call for inserting wire spring 164 into switching valve chest 122 through tapped hole 161, from which plug 162 has been removed in advance; inserting the ends 172 of the spring, while applying force so as to enlarge the space between the ends, into holes 174 at the both sides of switching operator 123; and screwing plug 162, to which spring holder 163 has already been so fitted to be able to rotate, to said tapped hole 161. In this process of screwing, although spring holder 163 rotates with plug 162 at first, when groove 173 of spring holder 163 comes locked with straight portion 171 of wire spring 164 as plug 162 proceeds, spring holder 163 comes to a standstill and only plug 162 is rotated.

Pump casing 181 is incorporated to the right side of body of switching device 111; working rod 113 is incorporated with piston rod 184 through connecting section 183 screwed over threaded portion 182 at the right end of working rod 113; piston 186 is incorporated to the end of said piston rod 184 through connecting section 185; ball 192 is provided inside suction port 191 open at the end of said casing 181 for the purpose of checking counterflow; ball 194 is provided inside through-hole 193 open at the center of said piston 186 for the purpose of checking counterflow; through-hole 195 is provided at said connecting section 185; and said through-hole 195 is connected, via inside pump casing 181, to pump casing screw socket 196 provided in switching device body 111, which socket 196 further leads to discharge port 198 via through-hole 197.

In FIG. 3, a reciprocating pump is shown as laid sideways due to drawing conditions, but in an actual situation, the device is used in the vertical, standing position.

Action of a device according to the present embodiment will be described hereunder;

The air supplied with pressure from air intake port 121 into switching valve chest 122 is sent through air supply vents 134 and 137, connecting port 138, pipe 143, etc. into working fluid chamber 118, internal pressure of which moves piston 117 to the right, and thus the air inside working fluid chamber 119 is pushed out through air supply vent 135, cavity 128 of switch 127 and exhaust vents 133 and 136.

This rightward movement of piston 117 results in, via working rod 113, movement of pump piston 186 to the right, and the liquid at the right side of piston 186 is transported to the left side of pump casing 181 through through-holes 193 and 195.

Near the end of this movement of working rod 113 to the right, switching operator 123 is moved to the right by bush 151; wire spring 164 is rotated to the right with its straight portion 171 as the fulcrum; as far as the neutral point shown in FIG. 3 both ends 172 of wire spring 164 are applied compressive pressure in the direction that they approach straight portion 171 so that spring force is conserved in wire spring 164; when the wire spring has passed the neutral point shown in FIG. 3 by even a short distance, repelling force conserved in wire spring 164 is instantaneously released to the right; and wire spring 164 rotates instantly from the said neutral point to the right and simultaneously pushes switching operator 123 to the right of switching valve chest 122.

With this instantaneous movement of switching operator 123 switch 127 is also transported to the right instantly; exhaust vent 133 and air supply vent 134 become connected with cavity 128; and switching valve chest 122, where pressurized air is supplied, becomes connected to air supply vent 132.

As a result compressed air is supplied from switching valve chest to working fluid chamber 119 through air supply vent 135; piston 117 is moved to the left, the air pushed out of working fluid chamber 118 is discharged out of the device through pipe 143, air supply vents 137 and 134, cavity 128 which has been moved, and exhaust vents 133 and 136.

This leftward movement of piston 117 is conveyed, through working rod 113, to pump piston 186, with the leftward movement of which the liquid at the left of said piston 117 is discharged out of the pump through hole 196 and through-hole 197, and simultaneously liquid is sucked from suction hole 191 into pump casing 181.

Near the limit of this leftward movement of working rod 113, large diameter section 152 comes to lock with switching operator 123, which moves to the left together with working rod 113; with this movement wire spring 164 is rotated in the left direction indicated in FIG. 3 with its straight portion 171 as the fulcrum; as described hereinabove, spring force is conserved in wire spring 164 as far as the neutral point and having passed this point, repelling force conserved in wire spring 164 is instantaneously released so that switching operator 123 is switched to the left instantly as well as switch 127.

Such actions as described above are repeated so that reciprocating action to drive the pump is continued.

Although, according to the embodiment shown in the drawings, plug 162 is screwed in order to attach spring holder 163 for wire spring 164, said plug 162 is not always necessary: for instance, a procedure such as calling for fitting the spring holder airtightly to the hole in switching device body 111 and bolting the flange provided at said spring holder to the body 111 may be used instead.

Third Embodiment

Figure 5:
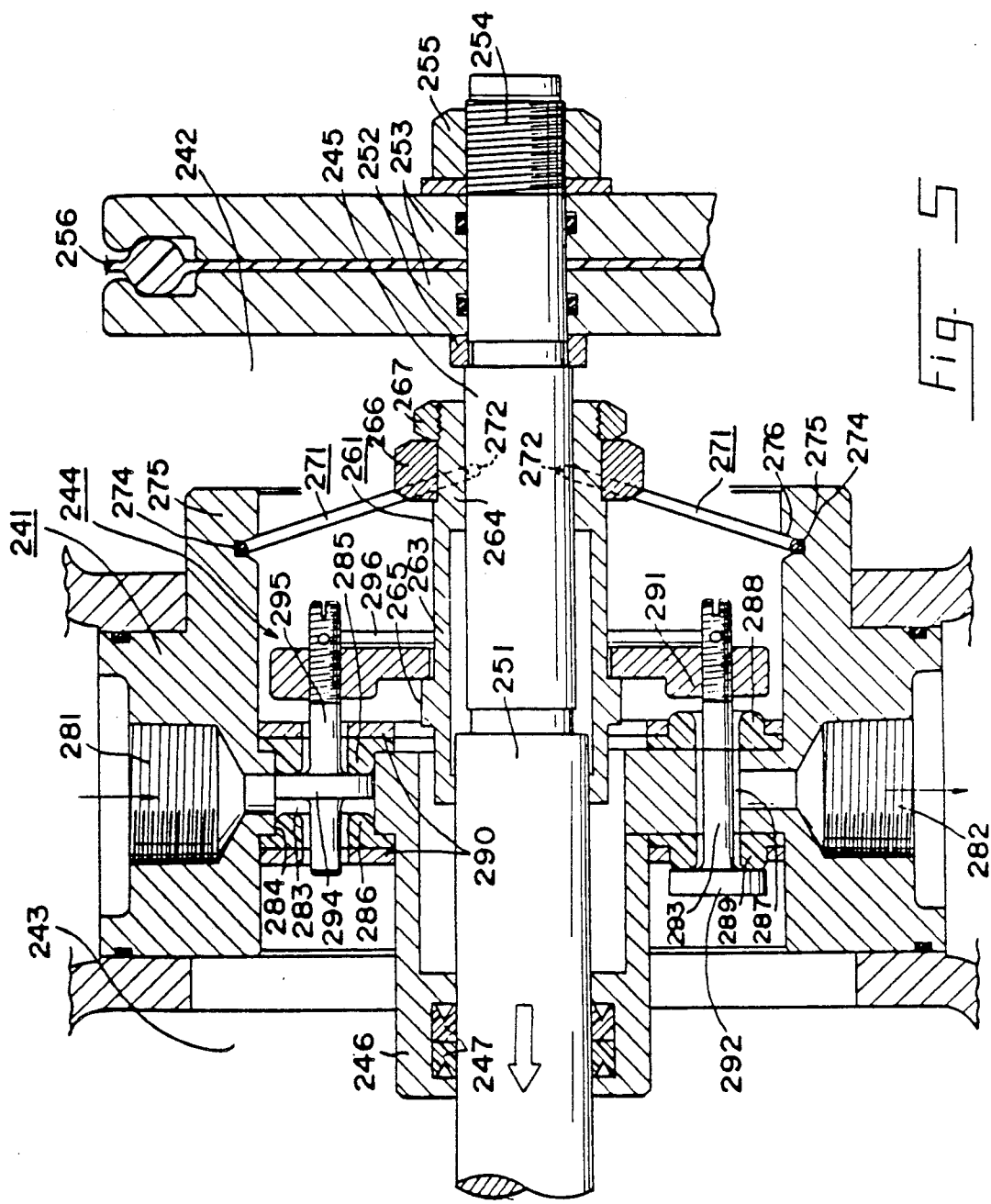
FIG. 5 is a schematic section view of a reciprocation switching device according to the third embodiment of the present invention.
Figure 6:
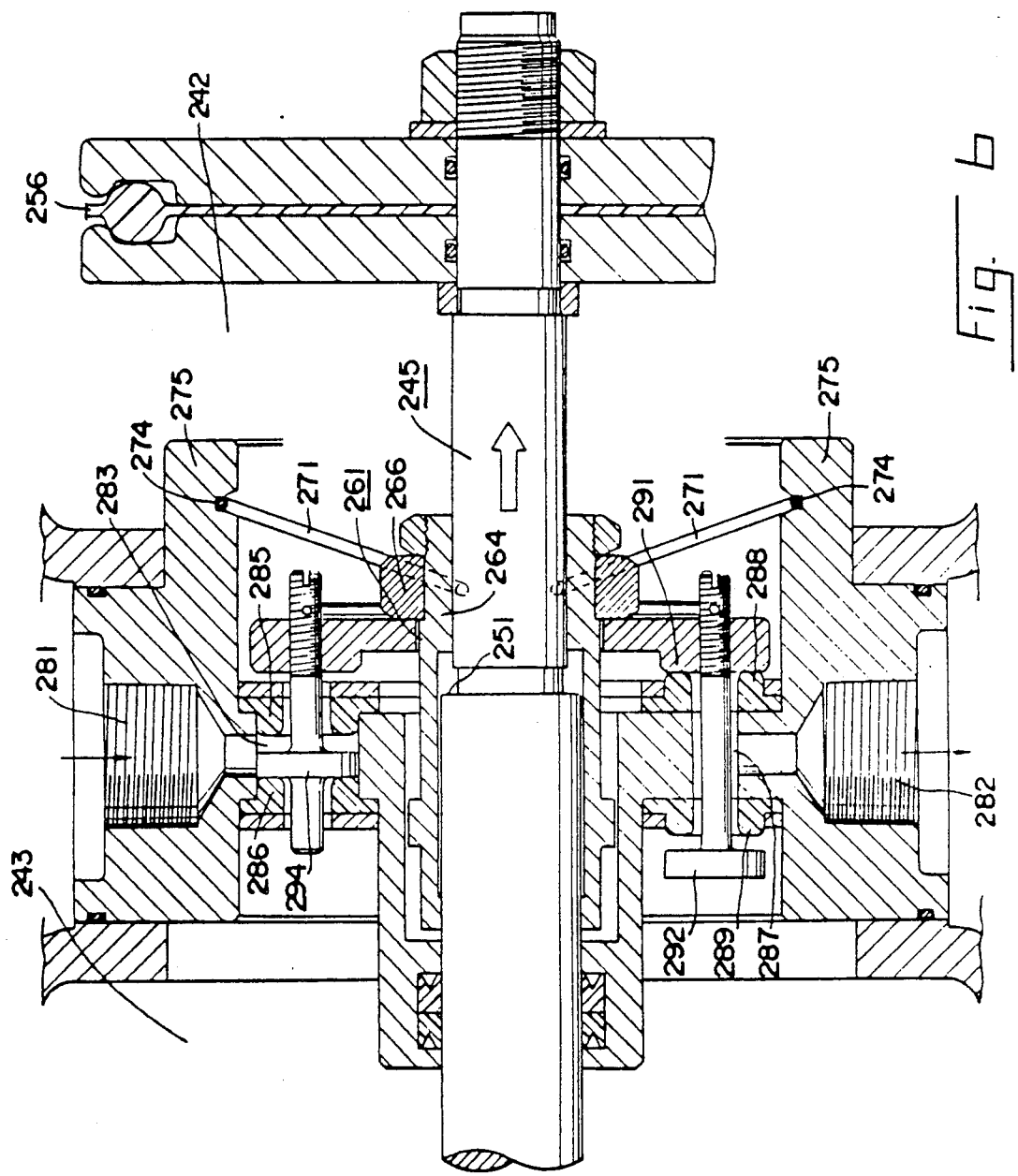
FIG. 6 is a schematic section view showing the switched position of same.

FIGS. 5 and 6 show a switching device for a diaphragm pump wherein switching mechanism section 244 is provided inside body 241 of switching device in order to control switching of supply and discharge of working fluid (for example, the air), which is supplied and discharged by turns into two working fluid chambers 242 and 243; working rod 245 reciprocated by working fluid supplied and discharged by turns into two working fluid chambers 242 and 243 is inserted through said switching mechanism section 244; and packing 247 is attached to the part where cylindrical section 246 at the center of switching device body 241 is fitted to said working rod 245.

Working rod 245 is incorporated with large diameter section 251 and also, with spacer 252 in between, with a pair of diaphragm sandwiching disks 253, fixed by nut 255 which is screwed over screw section 254. The center part of diapohragm 256 is supported by being sandwhiched between said disks 253.

Sleeve-like switching operator 261, which is moved to the switching position at one side and to that at the other side in relation to reciprocating movement of said working rod 245, is so fitted around said working rod 245 in the direction of the rod as to be movable within a specified scope. Said switching operator 261 comprises large internal diameter section 263, which is so fitted to large diameter section 251 of said working rod 245 as to slide along it, and small internal diameter section 264 to be caught with said large diameter section 251 or spacer 252; valve catching ridge 256 forms a part of the outer surface of large internal diameter section 263; and spring attacher 266 is fixed to the outer surface of small internal diameter section 264 with nut 267 screwed on the outer surface of small internal diameter section 264.

Figure 7:
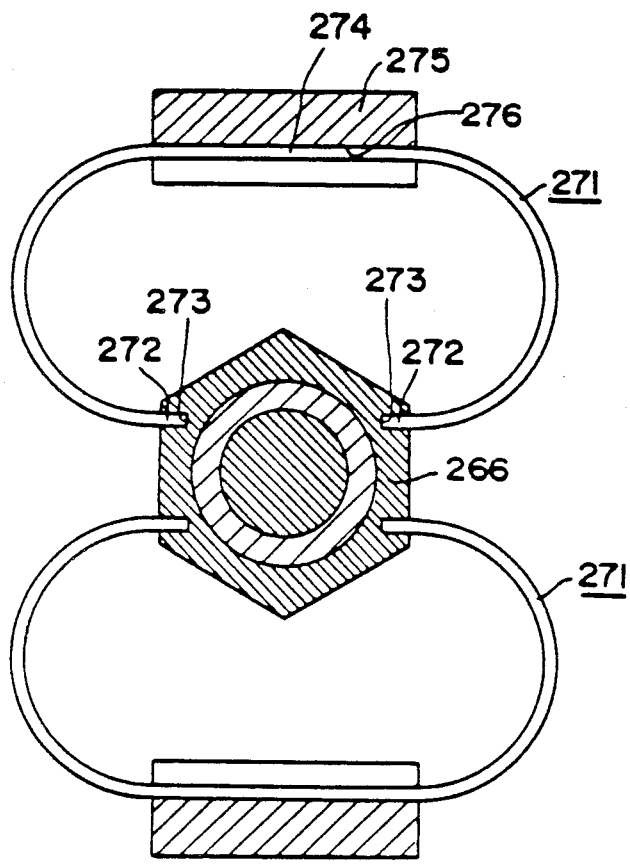
FIG. 7 is a schematic section view of principal part of same showing the wire springs in a fitted position.

Wire springs 271, which push switching operator 261 to the switching position at one side shown in FIG. 5 or to that at the other side shown in FIG. 6 by applying spring pressure force in such direction which is perpendicular to switching operator 261 at the neutral point, are provided symmetrically with each other over and under switching operator 261. Each of said wire spring 271 is formed into a C-like shape by bending both ends of wire material with the circular cross section (piano wire) so that they face each other as shown in FIG. 7. Both ends 272 of each wire spring 271 are so fitted into holes 273 bored horizontally in said wire spring attacher 266 as to be able to rotate, and straight portion 274 of said wire spring 271 is so fitted in groove 276 of spring holder 275 incorporated to said switching device body 241 as to be able to rotate.

As to said switching mechanism section 244, working fluid intake port 281 and working fluid exhaust port 282 provided in switching device body 244; valve chest 283 to be supplied with working fluid from working fluid intake port 281 is formed between a pair of valve seats 285 and 286 so fitted in holes 284 in the partition wall of switching device body 241 as to face each other; and said valve chest 283 leads into working fluid chamber 242 at one side of the device or working fluid chamber 243 at the other side through valve seats 285 or 286 respectively.

Further, through-hole 287 leading to said working fluid exhaust port 282 is bored through the partition wall of switching device body 241; valve seats 288 and 289 at the working fluid discharging side are provided in the opposite direction at both sides of said through-hole 287; and thus this through-hole 287 leads to working fluid chamber 242 at one side or working fluid chamber 243 at the other side through said valve seats 288 and 289 respectively.

Valve seat 285 at working fluid intake side and valve seat 288 at working fluid discharge side, both facing working fluid chamber 242, are formed on the same rubber plate, and valve seats 286 and 289 at the other side are formed likewise on another rubber plate. Each of these rubber plates is held by supporting plate 290 attached to a recessed part on each side of a partition of switching device body 241.

A part of the first working fluid discharge control valve 291 formed into a disk shape so opposes valve seat 288 at working fluid discharge side at one side as to be able to engage and disengage; the center part of said valve 291 is so fitted to switching operator 261 as to be able to slide in the moving direction of the switching operator between said catching ridge 265 and spring attacher 266. Said first working fluid discharge control valve 291 is incorporated with shaft 293 of the second working fluid exhaust control valve 292 facing to valve seat 289 at the other working fluid discharge side as well as with shaft 295 of working fluid intake control valve 294 movably fitted into said valve chest 283, both shafts 293 and 295 being screwed into valve 291. Wire 296 is inserted to said shafts 293 and 295 of valves 292 and 294 in order to prevent shift of position otherwise caused by rotation of the shafts.

As described above, said switching operator 261 is provided with valves 294, 291 and 292, all of which switch supply and discharge of working fluid supplied into switching mechanism section 244 into two working fluid chambers 242 and 243 by contancting and separating from valve seats 285, 286, 288 and 289, thus switching action to be done by switching operator 261.

Action of the device according to the present embodiment will be described hereunder, referring to FIGS. 5 and 6;

In the condition shown in FIG. 5, compressed air, serving as working fluid, supplied to working fluid intake port 281 is transported by pressure into left working fluid chamber 243 through valve chest 283 and then valve seat 286 at the left working fluid intake side; and working rod 245 moves to the left together with leftward expanding movement of the diaphragm (not shown in the drawing) located at the left side. With the pushing action of right diaphragm 256 moving together with working rod 245, the air in right working fluid chamber 242 is discharged, through valve seat 288 at the right working fluid discharge side and through-hole 287, out of working fluid exhaust port 282 to the outside.

Then, when the leftward movement of working rod 245 comes close to the limit, spacer 252 incoporated with working rod 245 catches switching operator 261; and after this engagement switching operator 261 moves to the left together with working operator 245; as said switching operator 261 approaches the neutral point, a pair of wire springs 271 between switching operator 261 and spring holders 275 are compressed, simultaneously rotating with their respective straight portion 271 as fulcrum; and immediately after passing the neutral point, where the two, upper and lower, wire springs 271 become on the straight line, restoring force conserved in wire springs 271 is released to the moving direction of the working rod so that switching operator 261 movably fitted to working rod 245 in its axial direction is instantaneously moved to the left as far as its fitting allows. Then, as shown in FIG. 6, spring attacher 266 incorporated in switching operator 261 strikes disk-shaped valve 291; and thus valves 291, 292 and 294 are switched instantly so that supply and discharge of working fluid into working chambers 242 and 243 are switched immediately.

In the condition shown in FIG. 6, compressed air, serving as working fluid, supplied to working fluid intake port 281 is transported by pressure into right working fluid chamber 242 through valve chest 283 and then valve seat 285 at the right working fluid intake side; and working rod 245 moves to the right together with rightward expanding movement of the right diaphragm 256. With the pushing action of the left diaphragm (not shown) moving together with working rod 245, the air in left working fluid chamber 243 is discharged, through valve seat 289 at the working fluid discharge side at the left and through-hole 287, out of working fluid exhaust port 282 to the outside.

Then, when the rightward movement of working rod 245 comes close to the limit, the larger diameter section 251 of working rod 245 catches the smaller internal diameter section 264 of switching operator 261; and after this engagement switching operator 261 moves together with working operator 245; as said switching operator 261 approaches the neutral point, the pair of wire springs 271 between switching operator 261 and spring holders 275 are compressed, simultaneously rotating rightward with their respective straight portion 274 as fulcrum, and when wire springs 271 pass the neutral point by even a short distance between straight portions 274 of the two wire springs, restoring force conserved in wire springs 271 is released to the moving direction of the working rod so that switching operator 261 movably fitted to working rod 245 in its axial direction is instantaneously moved to the right as far as its fitting allows. Then, as shown in FIG. 5, catching ridge 265 of switching operator 261 strikes disk-shaped valve 291; and thus valves 291, 292 and 294 are switched instantly so that supply and exhaust of working fluid into working chambers 242 and 243 are switched immediately.

Such actions as above are repeated, and thus the diaphragm pump is continuously reciprocated.

Assembly of each wire spring 271 calls for fitting straight portion 274 of wire spring 271 in groove 276 of spring holder 275 and inserting both ends 272 of wire spring into holes 273 of spring attacher 266 incorporated with switching operator 261 by pushing both ends 272 of wire spring 271 against its elasticity in order to enlarge the space.

Figure 8:
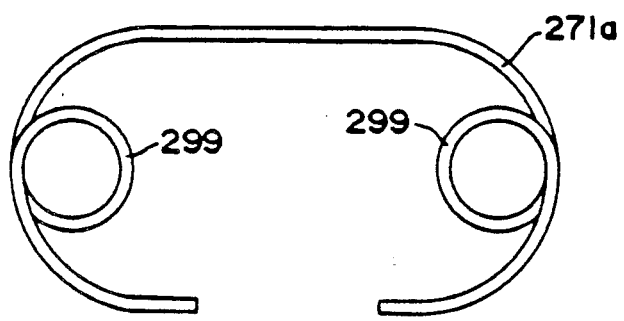
FIG. 8 is a schematic plan of an example of a wire spring of an irregular shape.

Further, as long as its total shape resembles the letter "C", said wire spring 271 may be formed into any similar shape: for instance, wire spring 271a shown in FIG. 8, which has loop 299 at each side, iss included in the category of wire springs according to the present invention, because its overall shape is similar to "C". Furthermore, section of wire spring 271 or 271a is not limited to the circular shape: wire material of irregular shape, such as hexagonal section, is also acceptable.

Fourth Embodiment

As shown in FIG. 9, cylinder head 312 is screwed to the top end of cylinder body 311 from outside, with O ring in between, and valve seat attaching section 314 from inside with O ring 315 in between.

Piston 321 is so inserted into cylinder body 311 as to slide therein with O ring 322 in between; and catching section 323 is screwed to the center of said piston 321. A pair of valve seats 325 molded with rubber or similar material is inset in the top of said valve seat attaching section 314; and shafts 328 of valves 327 are so inserted into said valve seats 325 and air intake vents 326 bored in said valve seat attaching section 314 as to be able to move.

Disk-shaped valve 331 is installed below said valve seat attaching section 314; and threaded portion 332 of shafts 328 of aforementioned valves 327 are screwed into this valve 331. A pair of valve seats 334 inset in the under surface of valve seat attaching section 314 face this valve 331. Said valve seats 334 are molded from rubber material as are aforementioned valve seats 325; and these valves 334 and exhaust vents 335 bored through valve seat attaching section 314 lead, through exhaust ducts 338 formed between outer cylinder 336 and inner cylinder 337, to exhaust ports 339 open to the outside of the device bored at the top of cylinder head 312. Numeral 340 referes to two O rings concentrically fitted between the two cylinders and the cylinder head.

As shown in FIGS. 9 and 10, the lower part of said valve seat attaching section 314 forms spring fitting section 341, where groove 342 is located on each side facing each other. Back 344 of C-shaped wire spring 343 is fitted in said groove 342 on each side. Both ends 345, facing each other with the gap in between, of each wire spring 343 are inserted into the horizontal groove bored on the side of catching ridge 347 at the bottom of valve operator 346. Said valve operator 346 has catching ridge 348 also at its top and is so inserted through the center of said disk-shaped valve 331 as to be able to slide.

Rod section 351 of piston 321 is incorporated with screwed-in plunger 352; and switching rod 365 so fitted through center hole 354 of said catching section 323 and center hole 355 of valve operator 346 as to be able to slide therein is inserted into the hollow of said plunger 352. Said switching rod 356 is incorporated with stopper 357 at its top end, which moves vertically together with the rod inside said inner cylinder 337 and, when descending, stops by said catching ridge 348, and with nuts 360 which is screwed over it and will be caught with said catching section 323.

The inside of said cylinder body 311 is divided by piston 321 into two sections: working air chamber 358 located above piston 321 and working air chamber 359 under the piston 321.

Pump body 361 is screwed over the lower part of said cylinder body 311; in this pump body 361 air intake duct 362 leading to said working air chamber 359 is formed; air intake pipe joint 363 is screwed over said air intake duct 362; air intake port 364 of said intake pipe joint 363 leads to said air intake duct 362 through air intake vent 365 as well as to air intake pipes 367 through air intake vent 366 bored at the side thereof and further to air chamber 369 inside cylinder head 312 through said air intake pipe 367 and bent pipe 368. Further, O rings 371 and 372 are attached around inside surface of said pump body 361 to maintain the atmospheric pressure of working air chamber 359.

As shown in FIG. 10, straight portion 382 at each end of semi-circular toggle 381 is inserted from inside into threaded portion 332 of each of said valve 327 to prevent said threaded portions 332 of valves 327 from swiveling. In case of disassembly, removal of this toggle 381, if necessary, calls for moving straight portions 382 at both ends towards the center, against its elasticity, and removing them from said threaded portions 332.

Said plunger 352 acts as a plunger pump together with check valve, etc. (not shown), but as it is an ordinary pump, the pump portion is not specifically illustrated in the drawings.

Action of a device according to the present embodiment is described hereunder referring to FIG. 9;

Description commences at the condition where a pair of wire springs 343 are positioned upward; valve operator 346 is positioned upward by their force; and disk-shaped valve 331 is also positioned upward by catching ridge 347 of the valve operator 346.

The air serving as the working fluid and conveyed with pressure from air intake port 364 into air chamber 369 though air intake pipe 367, etc. enters, through opened valve seats 325 and air intake vents 326, into air chamber 358 over the piston. At this moment valve seats 334 for exhaust are kept closed by disk-shaped valve 331. As the air is also being supplied into air chamber 359 under the piston through said air intake port 364, the air pressure applied to upper and lower sides of piston 321 is almost identical. However, the sizes of top and bottom surface areas under pressure are different, depending on the presence of piston rod section rod section 351, and as the area of the piston facing air chamber 358 under pressure is therefore larger than that facing air chamber 359, the force applied by air pressure of air chamber 358 upon piston 321 is larger, piston 321 moves downward relative to FIG. 9. Plunger 352 does discharge action in this stroke.

Near the end of this discharge stroke, catching section 323 of piston 321 meet with nuts 360 of switching rod 356; switching rod 356 is then moved downward; valve operator 346 is also moved downward by stopper 357 at the top of switching rod 356; and simultaneously both ends 345 of each wire spring 343 are moved downward with its back 344 at the center. At this stage compressive force works between 344 and each end 345 of each wire spring 343, and when ends 345 pass the position shown in Fig. and moves down by even a short distance, valve operator 346, driven by the restoring force of wire spring 343, is instantaneously moved downward a large distance. With this movement catching ridge 348 strikes disk-shaped valve 331, which opens valve seats 334 for exhaust, and at the same time valves 327 close valve seats 325 for air intake.

Consequently, supply of air from air chamber 359 to air chamber above the piston is cut off so that piston 321, air pressure being applied only from lower air chamber 359, moves upward. At this moment the air in air chamber 358 above the piston is discharged out of the system through opened valve seats 334, exhaust vents 335, exhaust ducts 338 and exhaust ports 339 in this order. In this stroke of upward of movement of the piston, plunger 352 does suction work.

When piston 321's upward movement reaches close to the limit, catching section 323 of piston 321 meets with valve operator 346, thus moving this valve operator 346 upwards; and simultaneously both ends 345 of each wire spring 343 are moved upward with its back 344 at the center. At this stage compressive force works between back 344 and each end 345 of each wire spring 343, and when ends 345 pass the position shown in Fig. and moves up by even a short distance, valve operator 346, driven by the restoring force of wire spring 343, is instantaneously moved upward a large distance. With this movement catching ridge 347 at the lower part of valve operator 346 strikes disk-shaped valve 331, which closes valve seats 334 for exhaust, and at the same time valve seats 325 for air intake are opened, and thus the condition of the device returns to the beginning of this description.

Further, although a pair of wire springs 343 are used in the present embodiment, a wire spring may be provided only at one side instead of two.

Fifth Embodiment

FIG. 11 is a schematic section view with cutting angle of 90° As shown in this FIG. 11, piston 412 is so fitted inside cylinder body 411 as to be able to slide vertically. The lower part of said piston 412 forms pump operation rod 413 with the hollow inside. Working fluid intake/exhaust body 414 is fixed around the lower part of cylinder body 411; and air intake port 416 at the upper part and liquid discharge port 417 at the lower part of said body 414 are sealed with packing 415 fitted inside body 414. Pump cylinder 418 is inserted and fixed to the lower part of said fluid intake/exhaust body 414; and a reciprocating pump (not shown) is installed at the lower part of said pump cylinder 418. Said air intake port 416 is a tapped hole to intake the compressed air supplied from a compressor or a similar device; and this air intake port 416 leads to tapped hole 422 at the other side via circular groove.

Said tapped hole 422 leads, through a pipe (not shown) to tapped hole 426 of working fluid supplier 425 at the top of this device. Said tapped hole 426 is formed in working fluid intake hole 427 bored in the center of said working fluid supplier 425.

Valve body 431 is screwed in the open top of said cylinder body 411; and said working fluid supplier 425 is screwed in the groove 432 at the upper part of said valve body 431. Space with a specified height is reserved under said working fluid supplier 425, in which space disk-shaped intake valve is so provided as to be able to move vertically. Working fluid vent 434 is bored through the center of said intake valve 433. Further, facing this intake valve 433, a pair of working fluid intake vents 435 (shown in FIG. 13) are bored in valve body 431; valve seats 436 are attached to the open top of said intake vents 435; and said intake valve 433 contacts and separates from said valve seats 436. Push rod 437 is inserted into each working fluid intake vent 435 with enough space to let sufficient amount of working fluid pass between the rod and the wall of the vent.

A pair of spring fitting sections 441 (FIG. 13) incorporated with valve body 431 protrude down from the lower part of valve body 431. Disk-shaped body 444 of exhaust valve 443 is so inset into grooves 442 formed at the base of spring fitting sections 441 as to be able to move vertically. Said exhaust valve 443 comprises disk-shaped body 444 and movable valve seats 445 fixedly attached to the body. Said movable valve seats 445 face valve body 431, in which working fluid exhaust vents 446 are provided at the position each directly facing each valve seat 445; and the top end of said working fluid exhaust vents 446 lead to cut-in groove 447, which is a right-angled channel cut in valve body 431. Exhaust cover 448 is fitted between the top of valve body 431 and the head of working fluid supplier 425; and the lower end of said cover 448, which is an open hole, is fitted around the outer circumference of the flange section of valve body 431 with exhaust space 449 in between. Said working fluid exhaust vents 446 lead to outside the system through cut-in groove 447 and exhaust space 449, forming the working fluid exhaust duct together with these parts.

Figure 12:
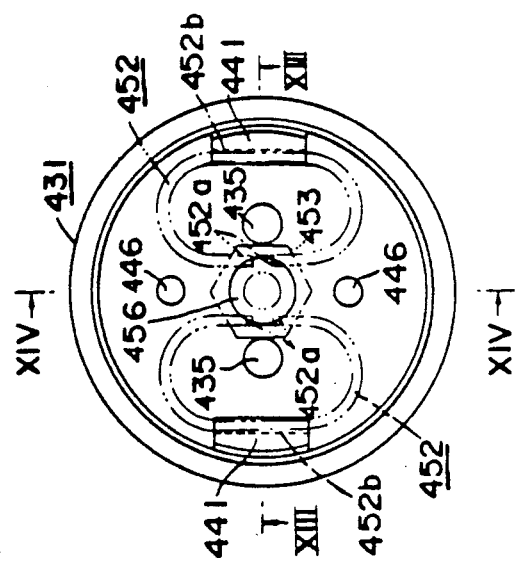
FIG. 12 is a base view of the valve body of same.

Further, each pair of wire springs made of piano wire or similar material formed into a C-shape as shown in FIG. 12 is so fitted in groove 451 formed at the lower part of each spring fitting sections 441 as to be horizontally symmetrical and rotatable. Edges 452a of end of wire springs 452 are so fitted into small holes bored in valve operator 453. This valve operator 453 has upper part of switching rod 454 screwed into it and is held by said C-shaped wire springs 452. The rod portion of valve operator 455 to activate exhaust valve 443 and incorporated with said valve operator 453 is screwed into the upper part of said switching rod 454. Said valve operator 455 is so inserted into hole 456 at the center of valve body 431 as to be able to move vertically. Said valve operator 453, switching rod 454 and valve operator 455 are integrated by means of split pin 457.

Operating plate 462 fitted inside piston 412 and fixed by supporting ring 461 is so inset to said switching rod 454 as to be able to move, and coil spring 463 is hooked to the upper side of said operating plate 462. Coil spring 466 is attached on spring holder 465 fixed to the bottom part of said switching rod 454 with pin 464. Thus, when said piston 412 moves upward, valve operator 453 is then flexibly pushed upward by upper coil spring 463 raised by operating plate 462; and when piston 412 descends, switching rod 454 is flexibly pushed down by lower coil spring 466 pressed down by said operating plate 462 so that valve operator 455 is moved downward.

Figure 14:
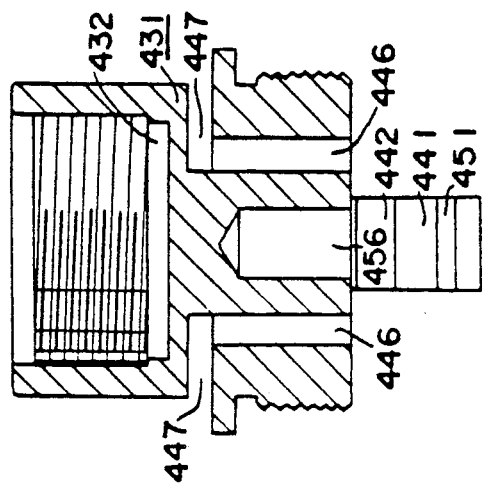
FIG. 14 is a schematic section view, cut at XIV—XIV line, of FIG. 12.
Figure 13:
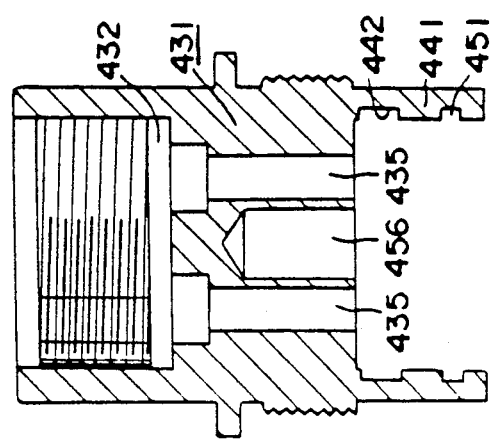
FIG. 13 is a schematic section view, cut at XIII—XIII line, of FIG. 12.

As shown in FIGS. 12, 13 and 14, said working fluid intake vents 435, spring fitting sections 441 and working fluid exhaust vents 446 are provided as to form a symmetry around hole 456 bored at the center of valve body 432.

Action of the device according to the present embodiment is described hereunder referring to FIGS. from 11 to 14.

Although C-shaped wire springs 452 are shown in the horizontal condition in FIG. 11, such form is an unstable condition where compressive force is working between each end 452a and straight portion 452b fitted in each spring fitting groove 451; in most cases wire springs 452 are in the condition where ends 452a are positioned upward or downward with straight portion 452b as fulcrum.

In case of ascending movement of piston 412, when valve operator 453 has been pushed by coil spring 463 up to the position shown in FIG. 11, ends 452a of wire springs 452 are instantaneously thrown back upward from the illustrated compresses position; and said valve operator 453 hits disk-shaped body 444 of exhaust valve 443. Said exhaust valve 443 then moves upward from the illustrated neutral point; and simultaneously with its movable valve seats 445's closing working fluid exhaust vents 446, push rod 437 is pushed up to ensure opening upper valve seats 436.

As a consequence, the compressed air supplied to said air intake port 416 is conveyed through circular groove 421 and the lower part of cylinder body 411 and works upon the lower surface of piston 412; and at the same time is conveyed to the upper inside of cylinder body 411 through tapped hole 422, the pipe (not shown), tapped hole 426, working fluid intake hole 427, working fluid vent 434 at the center of intake valve 433, the holes in valve seats 436 and working fluid intake vent 435; and thus pushes downward the upper surface of piston 412 and the bottom of the hollow inside of pump operation rod 413. Therefore, although the air pressure working upon piston 412 from the upper and lower surface is identical, the lower area of the piston under pressure is smaller than that of the upper area by the portion of sectional area of rod 413, and therefore the force pushing piston 412 downward is larger so that piston 412 is switched from upward movement to downward movement.

When piston 412 comes close to its descending limit, operating plate 462 incorporated with it pushes down spring holder 465 through coil spring 466, and so switching rod 454 is moved downward. Together with said switching rod 454, valve operator 455 also descends; and when ends 452a of C-shaped wire springs 452 are moved to, even by a short distance, a lower position than that shown in FIG. 11, repellent force of these wire springs 452 words downward. As the result valve operator 455 hits disk-shaped body 444 of exhaust valve 443, thus opening working fluid exhaust vents 446; and simultaneously, as upward-pushing force from disk-shaped body 444 to push rod 437 is gone, disk-shaped intake valve 433 descends to close valve seat 436, thus cutting of the supply of air pressure upon the upper surface of piston 412. Therefore, piston 412 and rod 413 are moved upward by air pressure applied from air intake port 416 through the lower inside of cylinder body 411 onto the upper surface of of piston 412; and the air in the part higher than piston 412 inside cylinder body 411 is exhausted out of the system though said working fluid exhaust vents 445, cut-in groove 447 and exhaust space 449.

Thus, vertical reciprocating action of piston 412 is repeated.

Sixth Embodiment

Figure 15:
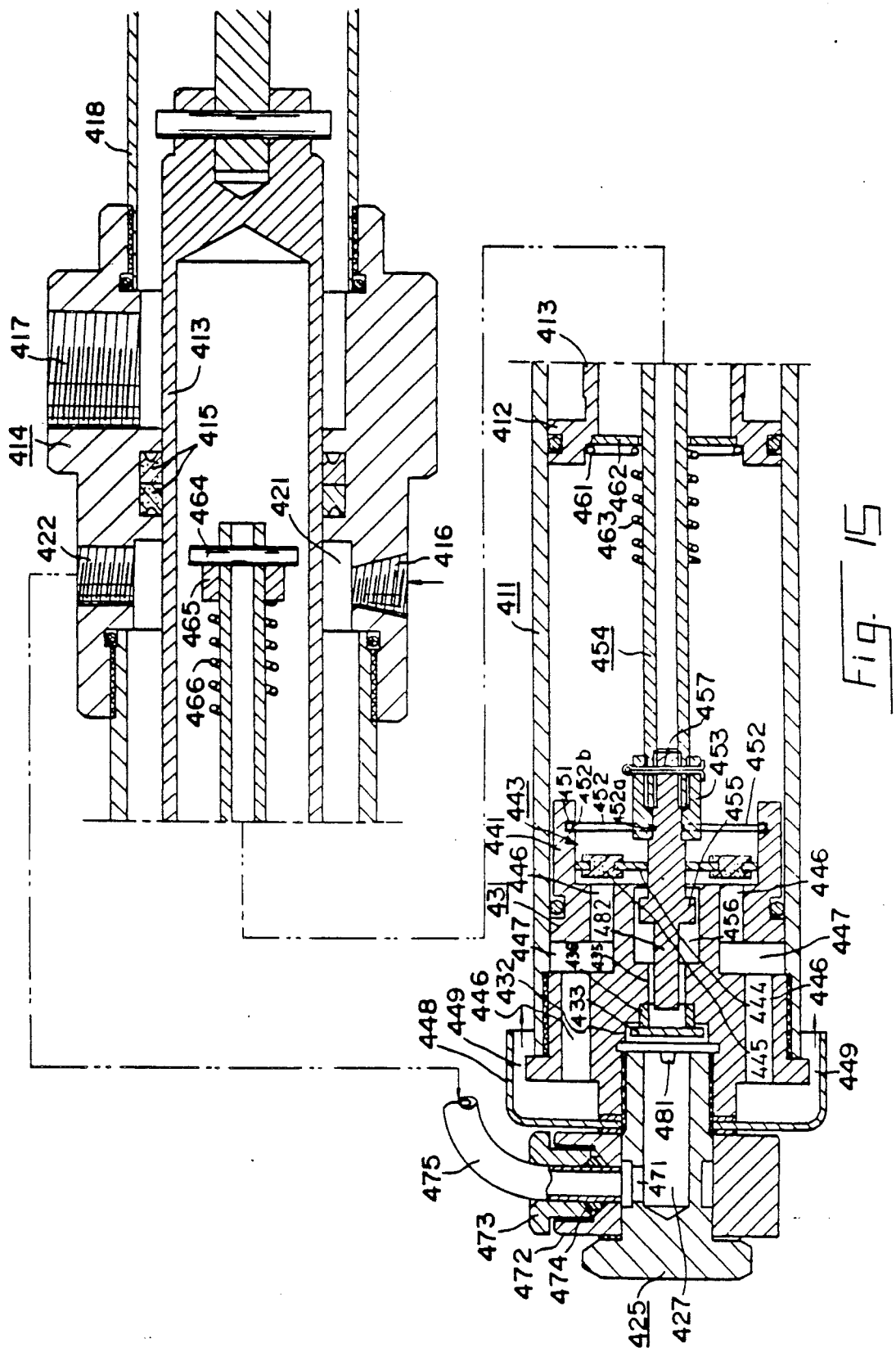
FIG. 15 is a schematic section view with cutting angle of 180° according to the sixth embodiment of the present invention.
Figure 16:
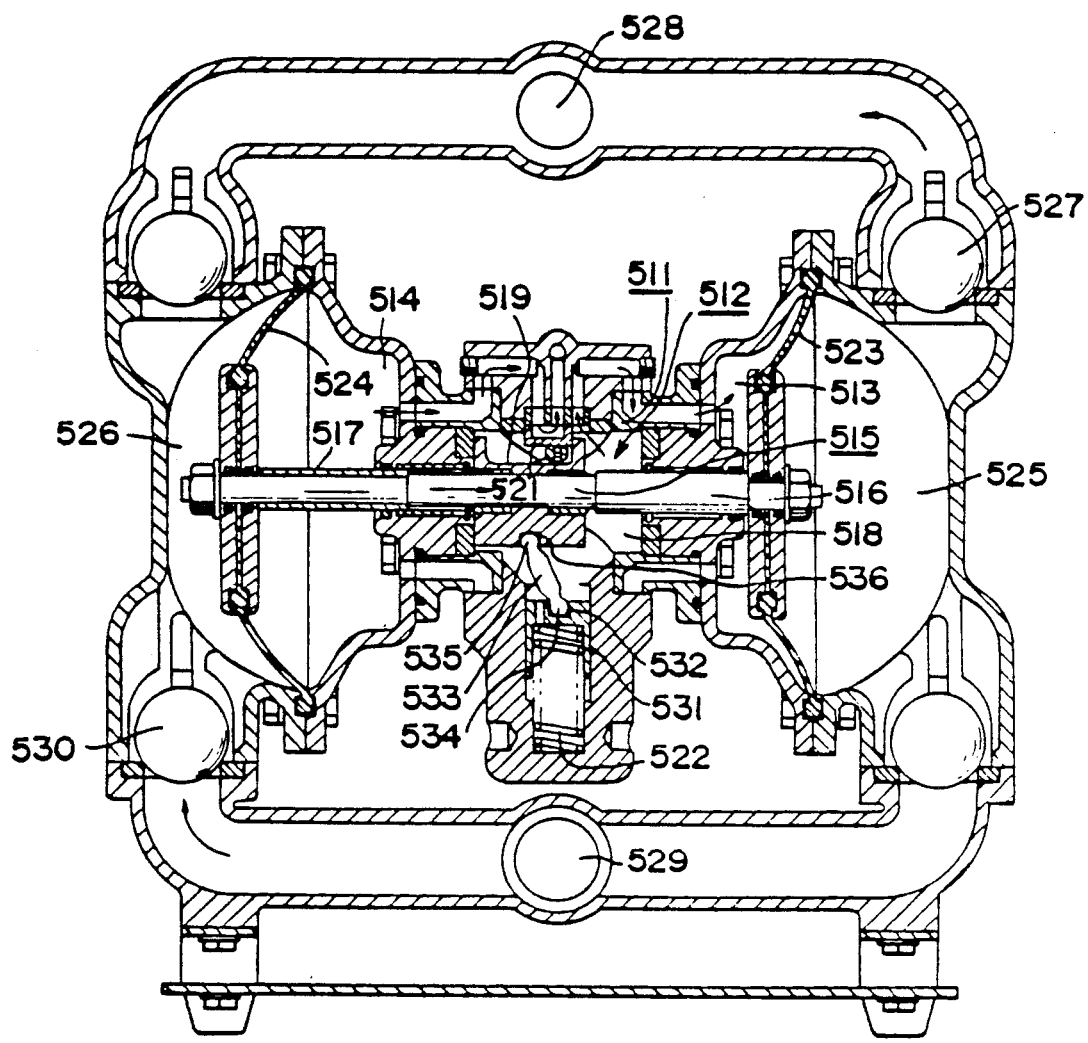
FIG. 16 is a schematic section view of a diaphragm pump equipped with a conventional reciprocation switching device.

The illustrated sixth preferred embodiment of the present invnetion will be described hereunder referring to the attached drawing of FIG. 15;

Although the device according to the present embodiment is shown as laid horizontally in the drawing, it is actually used in the vertically erected condition as with the fifth embodiment. Further, parts and sections similar to those shown in FIG. 11 are referred to with the same numerals, explanations for which are omitted. furthermore, as the present drawing, FIG. 15, is a sectional view with cutting angle of 180°, valve body 431, wire springs 452, shown in a horizontal symmetry.

Working fluid supply vent 471 is provided at the side of working fluid supplier 425; pipe joint body 472 is screwed over working fluid supplier 425; pucking 474 is pressed by cap screw 473 screwed into the side of said pipe joint body 425 so that pipe 474 fitted inside this packing 474 and leading to said working fluid supply vent 471 be kept air tight. The other end of said pipe 475 is connected to said tapped hole 422.

Cut-in groove 481 is provided at the end of said working fluid intake hole 427 so that, even when intake valve 433 comes into contact with the end of working fluid supplier 425, working fluid intake hole 427 is still connected to the hole in valve seat 436 through said cut-in groove 481 and space around intake valve 433. Said valve seat 436 and working fluid intake vent 435 are configured at the center of valve body 431. Further, push rod 482, which forms a part of said valve operator 455 and protrude from it, is so inserted into this working fluid intake vent 435 as to be able to move. Furthermore, each of working fluid exhaust vents 446 is divided into two sections by cut-in groove 447.

When C-shaped wire springs 452 have been turned to the left (in reality, upward), exhaust valve 443 is pushed by valve operator 453 so that the open end of working fluid exhaust vent 446 is blocked; and at the same time intake valve 433 is pushed by push rod 482 so that working fluid intake hole 427 and working fluid intake vent 435. Further, when wire springs 452 have been turned to the right (in reality, downward), intake valve 433 is closed by removal of pressure from push rod 482, and exhaust valve 443 is simultaneously opened by valve operator 453. As described as above, action of the device of this sixth embodiment is different from that of the fifth embodiment in that push rod 482 is moved together with valve operator 455 as one body. As to the other aspects, the action of the said two embodiments is identical and therefore its explanation will be omitted.

What is claimed is:

1. A reciprocation switching device for a pump, including:

a cylindrical body;

a piston fitted inside said body so as to be able to slide therein;

a valve seat attaching section integrally formed at an upper part of said body;

at least one spring fitting section integrally formed in said valve seat attaching section;

two kinds of valves for controlling the working fluid pressure applied upon an upper side of said piston in relation to the working fluid pressure upon a lower side of said piston, said two kinds of valves being movable and facing two kinds of valve seats attached to said valve seat attaching section;

a valve operator disposed at the center of said valve seat attaching section for operating said two kinds of valves in relation to reciprocating movement of;

said two kinds of springs including at least one wire spring engaging said at least one spring fitting section and said valve operator;

said at least one wire spring having a straight middle section and first and second end sections, said end sections being straight, collinear and parallel to one another and to said middle section.

2. A reciprocation switching device of claim 1, wherein a first one of said valves is disk shaped and is disposed at a lower side of said valve seat attaching section; and a second one of said valves is attached to said first one of said valves and is disposed at an upper side of said valve seat attaching section.

* * * * *